United States Patent [19]

Payne

[11] Patent Number: 5,246,166

[45] Date of Patent: Sep. 21, 1993

[54] SPRAYING APPARATUS

[75] Inventor: Nicholas J. Payne, Sault Ste. Marie, Canada

[73] Assignee: Her Majesty the Queen in the Right of Canada as represented by the Minister of Forestry, Quebec, Canada

[21] Appl. No.: 769,177

[22] Filed: Sep. 30, 1991

[51] Int. Cl.$^5$ ............................................. B05B 1/28
[52] U.S. Cl. ............................... 239/104; 239/693; 239/124; 239/597
[58] Field of Search ................. 239/597–599, 239/124, 104, 504, 499, 693, 690, 708

[56] References Cited

U.S. PATENT DOCUMENTS

| | | | |
|---|---|---|---|
| 1,588,503 | 6/1923 | Spigelmire | 239/597 X |
| 2,577,238 | 12/1951 | Edwinson et al. | 239/122 X |
| 3,197,299 | 7/1965 | Stull et al. | |
| 3,523,646 | 8/1970 | Waldrum | |
| 3,757,491 | 9/1973 | Gourdine | |
| 3,784,111 | 1/1974 | Piggott | |
| 4,310,474 | 1/1982 | Iyengar | |
| 4,412,654 | 11/1983 | Yates et al. | |
| 4,447,413 | 5/1984 | Rippstein, Jr. | 424/78 |
| 4,563,840 | 1/1986 | Orakami | 239/124 X |
| 4,572,165 | 2/1986 | Dodier | 239/597 X |

FOREIGN PATENT DOCUMENTS

| | | |
|---|---|---|
| 853043 | 10/1970 | Canada . |
| 948239 | 5/1974 | Canada . |
| 956671 | 10/1974 | Canada . |
| 1051286 | 3/1979 | Canada . |
| 1224982 | 8/1987 | Canada . |
| 1258834 | 8/1989 | Canada . |
| 2014779 | 4/1990 | Canada . |
| 0157089 | 9/1985 | European Pat. Off. . |
| 0326045 | 2/1989 | European Pat. Off. . |
| 3809517 | 5/1989 | Fed. Rep. of Germany . |
| 8701909 | 9/1987 | PCT Int'l Appl. . |

OTHER PUBLICATIONS

Droplet Size Characteristics for Insecticide and Herbicide Spray Atomizers (The Canadian Journal of Chemical Engineering, vol. 67, Oct. 1989) pp. 752–761–J. J. C. Picott, et al.

A Laboratory Device for Producing Single Drops in Uniform Sizes of 150–450 μm Diameter–C. R. Merritt & J. A. Drinkwater, pp. 457–462 (Agricultural Research Council Weed Research Org.).

Primary Examiner—Andres Kashnikow
Assistant Examiner—Kevin P. Weldon
Attorney, Agent, or Firm—Bell, Seltzer, Park & Gibson

[57] ABSTRACT

The present invention relates to a spraying apparatus and a method of using the same. The spraying apparatus can be used in the spraying of herbicides or insecticides from an aircraft or from the ground. The apparatus provides separation means to remove the small drop component of the spray so that the component leaving the apparatus is essentially free of small drops. Small drops have slight fallspeeds and are subject to wind drift, causing off-target deposits and potential biological impact outside the treatment areas.

22 Claims, 2 Drawing Sheets

SPRAYING APPARATUS

BACKGROUND OF THE INVENTION

1. Field of the Invention

The present invention relates to a spraying apparatus and a method of using the same. This spraying apparatus can be used for example in the spraying of the herbicides and insecticides from an aircraft or from the ground. This apparatus provides a means for removing the small drop component of the spray before it leaves the apparatus.

2. Description of the Prior Art

The pesticides used in agriculture and forestry are usually applied in sprays, either aerially or from the ground. A limitation of the atomizers presently available for operational use has to do with the generation and release of small drops, having diameters less than 100 microns. These drops have slight fallspeeds and are subject to wind drift, causing off-target deposits and potential biological impact outside the treatment areas. Pesticide drift is a significant problem related to the agricultural and silvicultural use of pesticides, and is the basis for several regulatory restrictions on pesticides spraying, and the cause of operational inefficiencies.

Various means have been tried to reduce the small drop fraction in pesticide spray clouds. Two operational atomizers have been designed to reduce the small drop fraction of the spray cloud, the Microfoil TM (Rhone Poulenc, Lansdale, Pa.) and Thru Valve TM (Waldrum Specialties Inc. Ambler, Pa.) booms, but these have achieved only partial success. (Picot et al., 1989, Cdn Jnl Chem. Eng. 67:752-61). Laboratory devices can provide narrow drop size spectra with a very small drop fraction, however, these are not suitable for operational applications because of flow rate limitations and the requirement for controlled operating conditions, e.g. lack of mechanical vibrations, constant flow rate, tank mix physical properties etc. (e.g. Merritt and Drinkwater, 1977, Pestic. Sci. 8:457-62).

Polymeric tank mix additives such as Nalcotrol TM have also been developed to reduce the small drop fraction. However, these have not eliminated the small drop fraction but only increased the size of the large drop portion of the cloud (Yates et al., 1985, Report FPM 85-2, USDA-FS, Davis, Calif.). The problem of small drop production is exaggerated when atomizers are mounted on aircraft, because the effect of the aircraft slipstream is to increase small drop proportion due to the relatively large amount of aerodynamic energy available for atomization.

There is an outstanding need for an atomization device for use on aircraft or in ground-based applications that provides better control of the small drop fraction of the spray cloud to substantially reduce or eliminate off-target deposit.

SUMMARY OF THE INVENTION

The present invention provides a spraying apparatus for use in the application of insecticides, pesticides or the like from aircraft or ground based sprayers. This apparatus provides improved drop size spectra compared with those produced by presently available operational devices, by substantially removing the small drop component.

Accordingly, it is an aspect of the present invention to provide a spraying apparatus comprising; an atomizer adapted to produce a flat planar spray, having a small drop component, from a liquid; a separation chamber having an exit slot; means to pass said spray in a planar path across said chamber to be delivered through said exit slot; separation means to remove the small drop component of said spray so that the component passing through said exit slot is essentially free of the small drop component, wherein said separation means comprises means for deflecting the small drop component transversely out of the planar path of the spray in said separation chamber.

A further aspect of the invention is to provide a method for producing a spray comprising; introducing a spray, having a small drop component, in a flat planar path into a separation chamber having an exit slot; deflecting the small drop component of said spray transversely out of the planar path of the spray; exiting the spray, essentially free of the small drop component, through the exit slot of the separation chamber.

The apparatus comprises a flat-fan hydraulic nozzle mounted in an atomization chamber having a transfer slot in the wall opposite the nozzle to admit the spray in a planar path to an adjacent separation chamber, which has means to create a crosswind to be directed through the spray to deflect the small drop component from the planar path. The separation chamber also has an exit slot in the end wall to permit the exit of the spray essentially free of the small drop component. The device also includes equipment to create the crosswind, separate the winnowing air flow and suspended drops, and collect the accummulated liquid.

BRIEF DESCRIPTION OF THE DRAWINGS

The invention will be further described with reference to the accompanying drawings showing, by way of an example, an embodiment of the invention, where.

DESCRIPTION OF THE PREFERRED EMBODIMENTS

Figure 1:
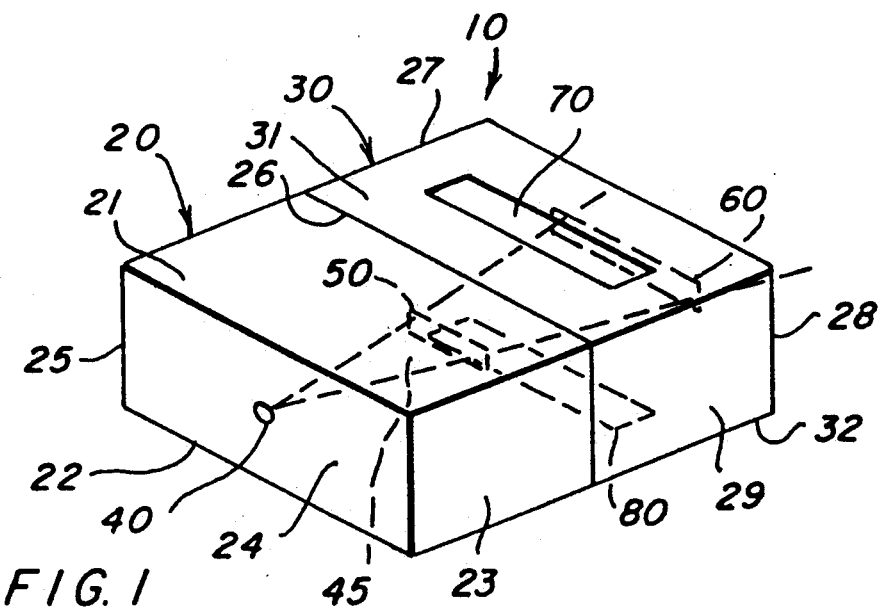
FIG. 1 is a schematic perspective view of the apparatus of the present invention.

Referring to the drawings, the spraying apparatus, shown generally at 10, comprises an atomization chamber 20 connected to a separation chamber 30. Each chamber 20, 30 contains a top wall 21, 31 (respectively), a bottom wall 22, 32 (respectively), and four side walls 23 to 26 and 26 to 29 respectively, the wall 26 being common to both the chambers 20 and 30.

The atomization chamber 20 contains a flat fan hydraulic nozzle 40 in side wall 24. Side wall 26 contains a horizontal transfer slot 50 that communicates between the atomization chamber and the separation chamber.

The separation chamber 30 also contains a horizontal exit slot 60 in side wall 28. Exit slot 60 is parallel to and aligned with transfer slot 50 and with the nozzle 40. The separation chamber 30 contains openings 70 and 80 in the top wall 31 and bottom wall 32, respectively.

Figure 2:
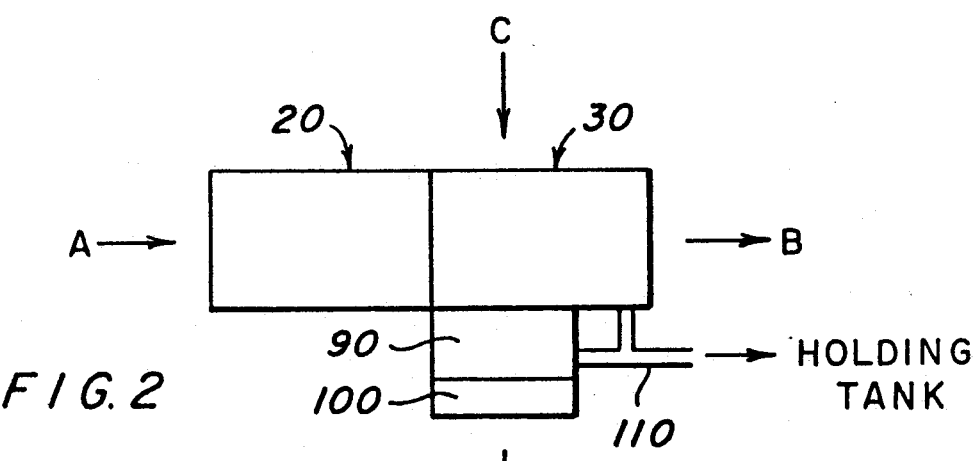
FIG. 2 is a schematic side view of the apparatus of FIG. 1.

Referring to FIG. 2, the separation chamber 30 is connected to a separator 90 which is located beneath the separation chamber and communicates with bottom opening 80. Piping 110 provides a connection between the separator 90 and the separation chamber 30 as well as between the separator 90 and a spray mix holding tank (not shown). The separator can, for example, be a cyclone separator, cascade impactor or filter. Located directly beneath the separator 90 is a fan 100.

Referring to FIGS. 1 and 2, the operation of the apparatus is as follows. A spray mix containing the pesticide, herbicide or the like is introduced into the flat fan hydraulic nozzle 40 in the atomization chamber 20 where a flat planar spray 45 is produced. The spray travels through the apparatus 10 in the direction of arrows A to B (FIG. 2). The liquid travels across the atomization chamber 20 where atomization is completed and enters the separation chamber 30 via transfer slot 50. In the separation chamber 30, the fan 100 creates a crosswind, by aspiration (in the direction of arrows C to D) flowing between the opening 70 and the opening 80 and leaving the apparatus downstream of the fan as indicated by the arrow D. The crosswind is thus transverse to the plane of the planar spray. The crosswind causes the small drop component of the spray to be deflected out of the planar path of the spray. The spray, essentially free of the small drop component, exits the separation chamber by exit slot 60.

The deflected component for the most part is entrained in the crosswind and leaves the separation chamber 30 through opening 80, and thereby enters the separator 90 where it is returned to the spray mix holding tank by piping 110. Some of the deflected component of the spray may impinge on the side walls of the separator chamber particularly on the wall below the exit slot 60. This material will drain to the bottom of the chamber 30 and then leaves through tubing 110 to be returned directly to the holding tank.

The rate of flow of the crosswind, the width of the exit slot, the velocity and width of the planar spray, and the area of the spray exposed to the crosswind all influence the extent of removal of the small drop component and all of these can be adjusted depending on particular requirements.

The use of a separate atomization chamber prevents the airflow in the separation chamber from causing interference with the atomization process. The crosswind air intake is baffled to suppress turbulence in the airflow that may excessively disturb the spray trajectory. The creation of the crosswind by aspiration minimizes the turbulence in the crosswind.

EXAMPLE 1

An apparatus having the following dimensions was used:

An atomization chamber (20) 25 cm wide, 8 cm deep and 8 cm long, with a transfer slot (50) 2 cm × 12 cm, opening into a separation chamber (30) 25 cm wide, 8 cm deep, 7 cm long with an exit slot (60) 2 × 20 cm, and openings in the upper and lower walls (31 & 32) for the winnowing crosswind 6 × 20 cm.

The flat fan hydraulic nozzle used to generate the planar spray was a Spraying Systems 8002 nozzle (Spraying Systems Company, Wheaton, Ill.) operated at a pressure of 69 and 138 kPa, with a tank mix of tap water containing Erio Acid Red dye at 0.4% w/w. This nozzle has an elliptical orifice with an opening about 0.375 mm$^2$ in area (major axis dimension 1.5 mm, minor axis dimension 0.5 mm) and the liquid flow rates and velocities at the orifice were 0.36 l/min and 16 m/s respectively for the 69 kPa setting and 0.54 l/min and for 24 m/s the 138 kPa setting.

The dropsize spectra in the spray plume emerging from the exit slot was measured by sampling the spray using a 10 × 10 cm highly calendered white Kromekote card. The card was passed quickly through the plume at a distance of 30 cm from the exit slot. A second sample was taken in a similar manner. Stain sizes on the Kromekote cards were measured using an image analysis system (Artek, Farmingdale, N.Y.), and 100 stains per card were sized. A spread factor of 1.8 was used to convert stain sizes to dropsizes (Waite, 1978, USDA-FS Technical Bulletin #1596).

RESULTS

TABLE 1

Measured dropsize spectra from the apparatus with and without a winnowing crosswind.

| | Liquid pressure (kPa) | | | | | |
|---|---|---|---|---|---|---|
| | 69 | | | 138 | | |
| | Crosswind (m/s) | | | | | |
| Statistic (microns) | 0 | 2.5 | 5.0 | 0 | 2.5 | 5.0 |
| Volume median diameter (D$_{V0.5}$) | 567 | 809 | 732 | 425 | 469 | 548 |
| Number median diameter | 228 | 393 | 441 | 110 | 251 | 304 |
| D$_{V0.1}$[1] | 308 | 407 | 423 | 204 | 251 | 298 |
| D$_{V0.9}$[1] | 921 | 1076 | 1073 | 784 | 819 | 850 |

[1]These diameters denote the 10th and 90th percentile points in the volume distribution.

TABLE 2

Spray volume proportion in drops having a diameter (D) of less than 100 microns, and reduction from crosswind

| | Liquid pressure (kPa) | | | | | |
|---|---|---|---|---|---|---|
| | 69 kPa | | | 138 kPa | | |
| Statistic | Air flow velocity (m/s) | | | | | |
| (%) | 0 | 2.5 | 5.0 | 0 | 2.5 | 5.0 |
| Proportion of spray volume in drops with D < 100 μm | 0.248 | 0.00139 | 0.0000532 | 1.49 | 0.116 | 0.0046 |
| Reduction in spray volume in drops with D < 100 μm from crosswind | — | 99.5 | 99.98 | — | 92.2 | 99.7 |

The following results demonstrate the percentage reduction in drops having a diameter of less than 100 microns that occurs under set airflow conditions, compared to no crosswind.

TABLE 3

| Air flow velocity | Reduction in spray volume (%) | |
|---|---|---|
| (m/s) | 69 kPa | 138 kPa |
| 2.5 | 99.5 | 92.2 |

TABLE 3-continued

| Air flow velocity (m/s) | Reduction in spray volume (%) | |
| --- | --- | --- |
| | 69 kPa | 138 kPa |
| 5.0 | 99.98 | 99.7 |

While this particular embodiment relates to the use of an aspirating fan to create the crosswind, it is to be appreciated that the slipstream of an aircraft can be used to drive the crosswind, thereby precluding the need for a fan and power source. In such an arrangement an air intake of adjustable cross-section can be projected into the aircraft slipstream, the cross-section being adjusted to achieve the desired air flow rate.

Figure 4:
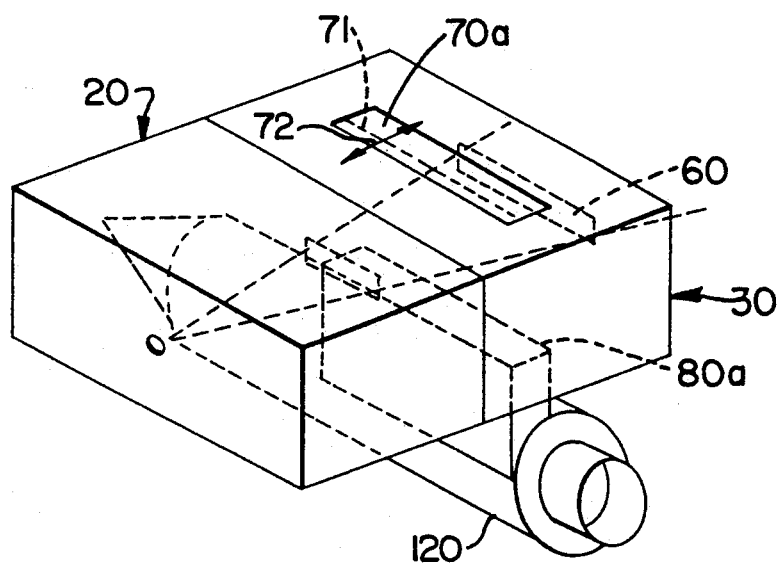
FIG. 4 is a schematic view similar to FIG. 1 showing a modified embodiment of the invention.

Such an arrangement is indicated schematically in FIG. 4. Specifically, the inlet 70a of the chamber 30 has a cross-section that is adjustable as indicated by the dashed line 71 and double headed arrow 72 to achieve the desired flow rate from the aircraft slip stream. This figure also illustrates the use of a cyclone separator 120 which communicates with the outlet 80a and is used to separate the small drop component from the airflow that passes through the separation chamber 30.

Figure 3:
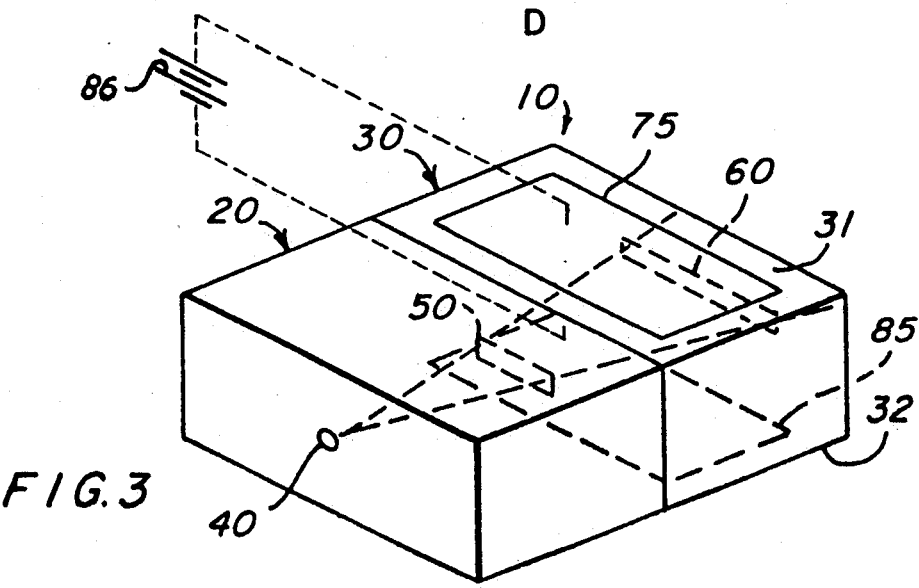
FIG. 3 is a schematic perspective view showing a further embodiment of the invention.

FIG. 3 illustrates another embodiment of the invention whereby the separation of the small component is achieved by the application of an electric field to the spray plume. The apparatus 10 comprises atomization chamber 20 which is identical to the first embodiment. The separation chamber 30 also comprises transfer slot 50 and exit slot 60 as in the first embodiment. The separation chamber in FIG. 3 contains flat plates 75 (top) and 85 (bottom) coplanar with the top 31 and bottom 32 walls of the separation chamber and positioned above and below the spray plume and held at earth and an elevated potential to provide a uniform electric field through the plume. The electric field is generated by a power source 86. Spray drops are generally charged on formation, and small drops have a larger charge-to-mass ratio than large drops and are therefore deflected to a greater extent by an electric field. With an appropriate electric field applied across the plates 75 and 85, the small drops will be deflected sufficiently to be impacted on the end wall above, or preferably below, the exit slot 60, or deposited on the upper 75 or lower 85 plates. The lower plate 85 is perforated to allow liquid to drain to the bottom of the separation chamber into piping 110 returning the spray mix holding tank as indicated in FIG. 2. The voltage difference between the flat plates, the width of the exit slot, the velocity and width of the planar spray will all influence the extent of removal of the small drop component and can be adjusted depending on particular requirements.

What I claim as my invention is:

1. A spraying apparatus for delivering a spray that is essentially without a small drop component, comprising; an atomizer adapted to produce a flat planar spray, having a small drop component, from a liquid, a separation chamber having an exit slot; means to pass said spray in a planar path across said chamber to be delivered through said exit slot; separation means to remove the small drop component to said spray so that the component passing through said exit slot is essentially free of the small drop component, wherein said separation means comprises means for deflecting the small drop component transversely out of the planar path of the spray in said separation chamber.

2. An apparatus as claimed in claim 1, wherein said separation means comprises means to pass a flow of air transversely through the spray; said flow of air being sufficient to deflect the small drop component out of the planar path without otherwise disrupting the planar spray.

3. An apparatus according to claim 2, wherein said means to supply a flow of air is a fan.

4. An apparatus according to claim 2, wherein said means to supply a flow of air is an air intake with adjustable cross section projecting into the aircraft slipstream.

5. An apparatus according to claim 1, wherein said separation means comprises means to apply an electric field transversely across the separation chamber, said electric field being sufficient to deflect the small drop component out of the planar path without otherwise deflecting the spray.

6. An apparatus according to claim 1, wherein a bottom portion of said separation chamber contains a means to collect the deflected component of the spray.

7. An apparatus according to claim 2, including means to collect the small drop components from said flow of air.

8. An apparatus as claimed in claim 1, wherein said atomizer is contained in an atomization chamber adjacent said separation chamber and communicating therewith through a transfer slot.

9. An apparatus according to claim 1, wherein said small drop component consists of drops having a diameter of less than about 100 microns.

10. An apparatus according to claim 1, wherein said apparatus is on a aircraft.

11. An apparatus according to claim 1, wherein said apparatus is on a vehicle.

12. A method for delivering a spray that is essentially without a small drop component, comprising; introducing a spray, having a small drop component, in a flat planar path into a separation chamber having an exit slot; deflecting the small drop component of said spray transversely out of the planar path of the spray; exiting the spray, essentially free of the small drop component, through the exit slot of the separation chamber.

13. A method according to claim 12, wherein the small drop component is deflected by subjecting the spray to a transverse flow of air.

14. A method according to claim 12 wherein the small drop component is deflected by subjecting the spray to a transverse electric field.

15. A method according to claim 12, wherein said small drop component consists of drops having a diameter of less than about 100 microns.

16. A method according to claim 12, including the step of collecting the small drop component an opening in a bottom portion of said separation chamber.

17. A method according to claim 13 wherein said flow of air is generated from the slipstream of an aircraft.

18. A method according to claim 13 wherein said flow of air has a velocity of between 1 m/s and 5 m/s.

19. A method according to claim 13, wherein said spray is prepared in an atomizer before being introduced into said separation chamber.

20. A method according to claim 19, wherein said atomizer is contained in an atomizing chamber.

21. An apparatus according to claim 7 wherein said means to collect the small drop component is selected from a filter and a cyclone separator.

22. A method for delivering a spray that is essentially without a small drop component, comprising; introducing a spray of a herbicide or pesticide liquid, having a small drop component, in a flat planar path into a separation chamber having an exit slot; deflecting the small drop component of said spray transversely out of the planar path of the spray by subjecting the spray to a transverse flow of air; and exiting the spray, essentially free of the small drop component, through the exit slot of the separation chamber.

* * * * *